Patented Aug. 23, 1927.

1,640,148

UNITED STATES PATENT OFFICE.

CRESZENZIA GLASER, NÉE PLETTL, OF PARIS, FRANCE.

PROCESS FOR PROTECTING THE GELATIN COATING OF PHOTOGRAPHIC PLATES AND FILMS.

No Drawing. Application filed October 7, 1926, Serial No. 140,204, and in France June 14, 1926.

The present invention has for its object to protect and render impervious in an absolute manner the layer of gelatin sensitized with silver salts applied to sheets of glass to constitute photographic plates or to films formed of sheets of transparent celluloid or other similar transparent plastic material.

The different attempts which have already been made in order to protect sensitized gelatin consisted in using certain unstable varnishes which however did not render the gelatin impervious.

The process forming the object of the present invention causes a transparent and brilliant special coating forming a protecting film to adhere to the sensitive gelatin, this coating withstanding friction and being damp-proof, and characteristic in that it penetrates the whole thickness of the sensitized gelatin without doing any harm to the photographic pictures, whether such pictures are in black and white, in colours or coloured by any known process.

As regards more particularly films of plastic matter, the special coating enables them to keep their original flexibility, which is of an invaluable advantage in the case of cinematographic films, the lateral perforations of which remain intact after having been coated with the special coating made according to the present process.

Furthermore the special coating insulates the layer of gelatin, protecting it from the too great heat to which cinematographic films are submitted when exposed for a certain time in front of the lenses of projecting apparatus; the gelatin no longer scorches as is the case with films not protected with the special coating made according to the present process.

The principal advantages as above set forth result in the maximum length of preservation of photographic negatives on glass and films that do not change in any way when important printing operations are carried out with them to make numerous photographic positives on paper.

Furthermore, positives on glass and on films do not alter when submitted to daylight and no longer fear the consequences of different handlings and wear.

Finally it is to be observed that as the special coating removes grease, or in other words purifies the gelatin on photographic plates and films by means of one of the chemical products contained therein, it follows that, after the special coating made according to the present process has been spread on the sensitized gelatin, the shades of the photograph become very pure, that is to say, are no longer fogged.

Whence it can easily be understood that photographic proofs made from negatives covered with the special coating enable positive photographic copies to be obtained with extremely pure tones; such positives, when projected upon a screen, produce the best results.

The process forming the object of the present invention is carried out as follows:

A solution of transparent celluloid or other plastic material of any kind selected among similar transparent plastic material is prepared.

Also, a solution of white or brown shellac is prepared.

The two above solutions are mixed together and acetic ether, acetic acid and amyl acetate are added thereto.

The whole of the above indicated chemical products and materials form a special coating which is spread on the layer of gelatin, sensitized with silver salts, on photographic glass plates or photographic films consisting in sheets of celluloid or other similar plastic material.

This special coating is applied by any one of the methods as known up to the present in the manufacture of photographic surfaces, particularly in spreading on the gelatin laid on glass plates or films made of sheets of celluloid or other similar plastic material.

As regards the proportions or quantities of the chemical products and material composing the two solutions of celluloid and shellac as above indicated, it is to be noted that their quantitative proportions vary according to the kind or to the more or less resisting nature of the gelatin used for preparing the surfaces of gelatin applied to glass plates or celluloid films which are to be protected by the present special coating.

However the tests for quantitative proportions appropriate to the gelatin used and required to be carried out by the person employing the present process when preparing his two solutions of celluloid and shellac as indicated above and before spreading the special coating, can be based upon the following approximate proportions:

For the solution of transparent celluloid:
85 to 100 grams of plastic material dissolved in 800 to 850 grams of acetic ether mixed with 35 to 50 grams of amyl acetate.

For the white or brown solution of shellac:
200 to 250 grams of white or brown shellac dissolved in 700 to 750 grams of alcohol at 96°.

The smallest quantities of each of the above indicated products are appropriate to the sensitized gelatin affording a smaller resistance to support conveniently the absorption of the celluloid matter and of the shellac contained in these two above indicated solutions.

Now the special coating which is spread on the sensitized gelatin is composed as follows:

| | |
|---|---|
| Transparent celluloid solution | 300 grs. |
| White or brown shellac solution | 150 grs. |
| After mixing the two solutions in the above proportions, add: | |
| Acetic ether | 400 grs. |
| Glacial acetic acid | 150 grs. |

For 1.000 grs. of the special coating applied according to the process forming the object of the present invention.

I claim:—

Process for protecting and rendering impervious the layer of gelatin made sensitive with silver salts, of photographic plates made of glass sheets or on films constituted by sheets of celluloid or other similar plastic material, this process consisting in putting on the plates a coating comprising, for 1000 grams, 300 grams of a solution of transparent celluloid, 150 grams of a solution of gum-lac, 450 grams of acetic ether and 150 grams of glacial acetic acid, the solution of transparent celluloid being by itself composed of 85 to 100 grams of plastic materials dissolved in 800 to 850 grams of acetic ether mixed with 35 to 50 grams of amyl acetate and the solution of gum-lac being composed of 200 to 250 grams of gum-lac dissolved in 700 to 750 grams of alcohol at 96°, substantially as described.

In testimony whereof I affix my signature.

CRESZENZIA GLASER, née PLETTL.